(12) United States Patent
Whitemiller et al.

(10) Patent No.: US 7,340,836 B2
(45) Date of Patent: Mar. 11, 2008

(54) HAND TOOL FOR MEASURING AND CUTTING

(75) Inventors: Anthony F. Whitemiller, Naperville, IL (US); Brent W. Murray, Longmont, CO (US); Ronald A. Angstead, Longmont, CO (US)

(73) Assignee: Accurate Concepts, Inc., Naperville, IL (US)

( * ) Notice: Subject to any disclaimer, the term of this patent is extended or adjusted under 35 U.S.C. 154(b) by 114 days.

(21) Appl. No.: 10/628,608

(22) Filed: Jul. 29, 2003

(65) Prior Publication Data

US 2005/0022390 A1 Feb. 3, 2005

(51) Int. Cl.
*B26B 3/06* (2006.01)

(52) U.S. Cl. .............................. 30/152; 30/155; 30/162

(58) Field of Classification Search .......... 30/151–153, 30/155, 162, 335, 161, 293, 296.1, 329, 336; 7/118; D8/95, 99; 33/668, 770
See application file for complete search history.

(56) References Cited

U.S. PATENT DOCUMENTS

| 3,192,630 | A | | 7/1965 | Dineson | |
|---|---|---|---|---|---|
| 3,286,351 | A | * | 11/1966 | McAlister | 33/42 |
| D238,247 | S | * | 12/1975 | Thomas, III | D8/99 |
| 4,255,856 | A | * | 3/1981 | Mackie | 30/293 |
| 4,507,869 | A | | 4/1985 | Stude | |
| 4,805,304 | A | * | 2/1989 | Knoop | 30/335 |
| 4,890,387 | A | | 1/1990 | Canino | |
| 4,974,320 | A | | 12/1990 | Pelletier | |
| 4,993,093 | A | * | 2/1991 | Goldwitz | 30/123 |
| 5,035,054 | A | * | 7/1991 | Ellenberger | 30/233 |
| 5,197,195 | A | | 3/1993 | Aikens | |
| 5,203,085 | A | * | 4/1993 | Berns | 30/162 |
| 5,206,965 | A | * | 5/1993 | Rowley | 30/329 |
| 5,289,637 | A | * | 3/1994 | Coffey | 30/335 |
| 5,406,711 | A | * | 4/1995 | Graham | 33/42 |
| 5,435,062 | A | * | 7/1995 | Huang | 30/162 |
| 5,515,617 | A | | 5/1996 | Canfield | |
| 5,542,184 | A | | 8/1996 | Beard | |
| 5,581,834 | A | * | 12/1996 | Collins | 7/118 |
| 5,623,737 | A | | 4/1997 | Moyer, Jr. et al. | |
| 5,647,129 | A | * | 7/1997 | Stamper | 30/161 |
| D386,381 | S | | 11/1997 | Black et al. | |
| 5,794,350 | A | * | 8/1998 | Shand | 30/162 |
| 5,890,290 | A | * | 4/1999 | Davis | 30/162 |
| 6,044,565 | A | * | 4/2000 | Arend et al. | 30/319 |
| D437,767 | S | * | 2/2001 | Van Deursen | D8/99 |

(Continued)

OTHER PUBLICATIONS

Allway Tools®, 2005.*

*Primary Examiner*—Jason Prone
(74) *Attorney, Agent, or Firm*—Harold A. Burdick

(57) ABSTRACT

A combination tool for measuring and cutting materials such as drywall is disclosed. The tool includes a mount formed by first and second housing portions, the first and second housing portions defining a path terminating at an opening at one end of the mount. A tape measure blade receiving slot opens into the mount adjacent to the path and is located and oriented so that the slot and the path are substantially coplanar. A knife blade shuttle is movable along the path and a saw blade is pivotably connected in the mount. An exterior surface of one of the housing portions includes a plurality of rasp teeth formed thereon for filing cut material.

14 Claims, 13 Drawing Sheets

U.S. PATENT DOCUMENTS

| | | | |
|---|---|---|---|
| D439,491 S * | 3/2001 | Falt | D8/99 |
| 6,363,614 B1 | 4/2002 | Umstead et al. | |
| 6,367,154 B2 * | 4/2002 | Degabli | 30/162 |
| 6,467,173 B1 * | 10/2002 | Umstead et al. | 30/162 |
| 6,467,174 B1 * | 10/2002 | Kotori | 30/293 |
| 6,513,246 B2 * | 2/2003 | Ping | 30/335 |
| D473,778 S * | 4/2003 | Hsu | D8/99 |
| D478,493 S * | 8/2003 | Martone et al. | D8/99 |
| 6,729,028 B1 * | 5/2004 | Hsu | 7/118 |
| D509,724 S * | 9/2005 | Cook | D8/99 |
| 7,003,833 B2 * | 2/2006 | Feliciano | 7/118 |
| D535,171 S * | 1/2007 | Ping | D8/99 |
| 7,260,898 B2 * | 8/2007 | Snelson | 33/668 |
| D551,050 S * | 9/2007 | Ping | D8/99 |
| 7,266,854 B1 * | 9/2007 | Gomez | 30/162 |
| 2002/0124411 A1 * | 9/2002 | Huang | 30/161 |
| 2003/0079294 A1 * | 5/2003 | Van Deursen et al. | 7/118 |
| 2004/0177515 A1 * | 9/2004 | Horton | 30/319 |
| 2005/0155226 A1 * | 7/2005 | Van Deursen et al. | 30/155 |
| 2005/0235499 A1 * | 10/2005 | Van Deursen et al. | 30/152 |

* cited by examiner

HAND TOOL FOR MEASURING AND CUTTING

FIELD OF THE INVENTION

This invention relates to tools for cutting, measuring and sawing, and, more particularly, relates to combination tools for cutting construction materials such as drywall.

BACKGROUND OF THE INVENTION

Various hand tools utilized for cutting construction materials such as drywall or the like have been widely utilized and include such standard single use tools as keyhole saws, utility knives, rasp files and the like. Moreover, hand tools that combine multiple tools in a single tool housing are also known and utilized (see, for example, U.S. Pat. Nos. 4,890,387, 4,974,320, 6,363,614, 5,623,737, and Des. 386,381). However, such heretofore known combined tools have not always proven to be safe, convenient to use and durable, are often not properly configured for best application of such combined functions, and/or do not offer the most useful and complete selection of utilities in the combination given the combined tool's anticipated functions. Such failures have, more often than not, led users to remain reliant on the well known single use tools, even though this requires the users to carry a greater number of tools on a job site and to keep track of the tools while working. Further improvements in such multiple use combined tools could, therefore, still be utilized.

SUMMARY OF THE INVENTION

This invention provides an improved combination hand tool for measuring and cutting construction materials such as drywall and the like. The durable combination tool of this invention provides a useful and complete complement of tools in the combination selected in view of the combined tool's anticipated functions. The tool is safe and convenient to use, and is configured for ease and accuracy of application of the combined functions.

The tool includes a mount having a path defined thereat terminating at an opening at one end of the mount. A tape measure blade receiving slot is located in the mount adjacent to the path, with the path and the slot preferably being oriented in a substantially coplanar relationship at the mount. A knife blade shuttle is selectively movable along the path defined at the mount. A saw blade is preferably provided and is pivotably connected at the mount opposite the opening at the one end of the mount The mount is preferably formed by assembly of first and second housing portions and configured with a handle portion and a head portion. The path is linearly defined by the first and second housing portions between a terminus in the handle portion and the opening which is located at the head portion between the first and second housing portions. The tape measure blade receiving slot is also defined in the head portion by the first and second housing portions. The saw blade is preferably pivotably connected at the handle portion of the mount, and an exterior surface of the mount is preferably characterized by a plurality of rasp teeth thereat for filing cut material.

It is therefore an object of this invention to provide an improved combination hand tool.

It is another object of this invention to provide a combination tool for measuring and cutting construction materials such as drywall.

It is still another object of this invention to provide a combination hand tool that is durable, safe and convenient to use in any configuration, that is configured for ready application of its combined functions, and that affords a utile and functionally complete selection of tools in the combination.

It is yet another object of this invention to provide a combination tool that includes a mount having a path defined thereat terminating at an opening at one end of the mount, a tape measure blade receiving slot being located in the one end of the mount adjacent to the path, and a knife blade shuttle selectively movable along the path defined at the mount.

It is another object of this invention to provide a hand tool for measuring and cutting including a mount including a handle portion and a head portion, a linear path formed therein between a terminus in the handle portion and an opening from the head portion, a tape measure blade receiving slot defined in the head portion and oriented so that the slot and the linear path are substantially coplanar, a knife blade shuttle selectively movable along the linear path formed in the mount between the terminus and the opening, and a saw blade pivotably connected at the handle portion of the mount.

It is yet another object of this invention to provide a combination tool for cutting drywall that includes first and second housing portions forming a mount when assembled, the mount having a path defined therein by the first and second housing portions with the path terminating at an opening between the first and second housing portions at one end of the mount, a tape measure blade receiving slot defined in the mount by the first and second housing portions and located in the one end of the mount adjacent to the path, and an exterior surface of the mount characterized by a plurality of rasp teeth thereat for filing, a knife blade shuttle selectively movable along the path defined in the mount, and a saw blade pivotably connected in an opposite end of the mount from the one end.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
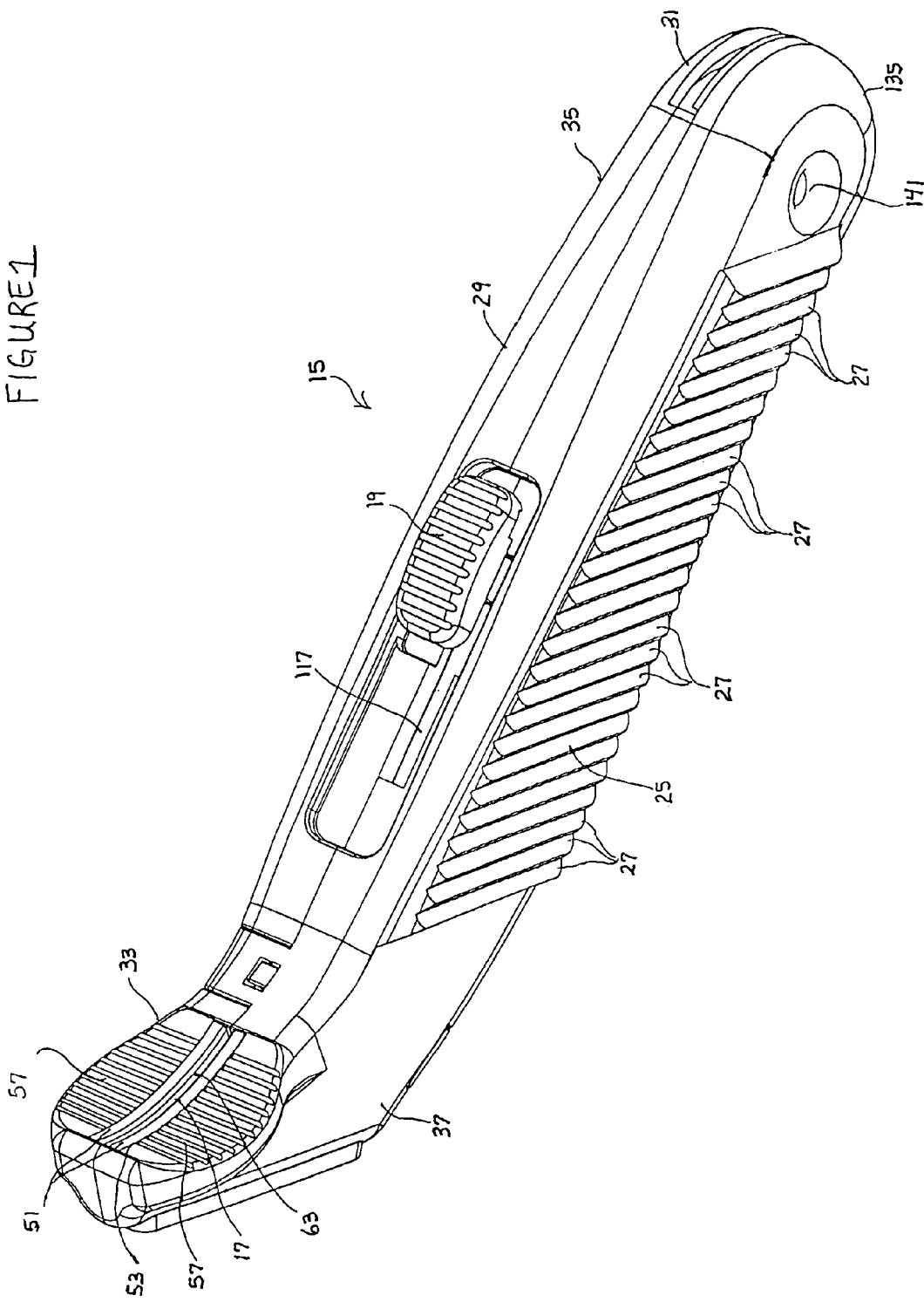
FIG. 1 is a perspective view of the combination tool of this invention.
Figure 2:
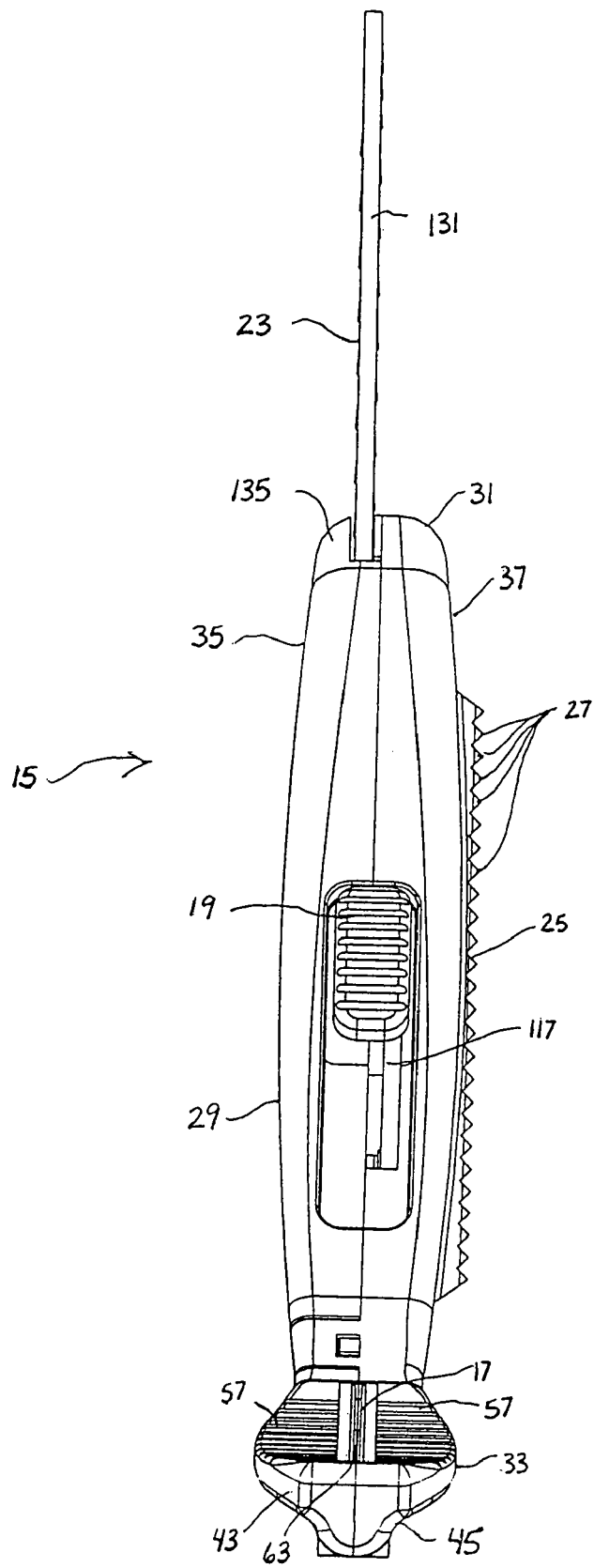
FIG. 2 is top elevation view of the tool of FIG. 1 with one portion thereof extended.

A first (and presently preferred) embodiment 15 of a measuring and cutting hand tool in accord with this invention is illustrated in FIGS. 1 through 7. The utilities combined in the tool of this invention include a tape measure blade holder assembly 17, a retractable shuttle 19 for carrying a razor knife blade 21, a pivotable hole saw 23, and a rough file 25 formed by rasp teeth 27. All of the utilities are contained by or configured on mount 29 having a handle portion 31 and an angled head portion 33, mount 29 defined by the assemblage of first and second housing portions 35 and 37, respectively. The mount can be made of any material conventional for such tools including durable plastics, cast aluminum, or the like.

Figure 3:
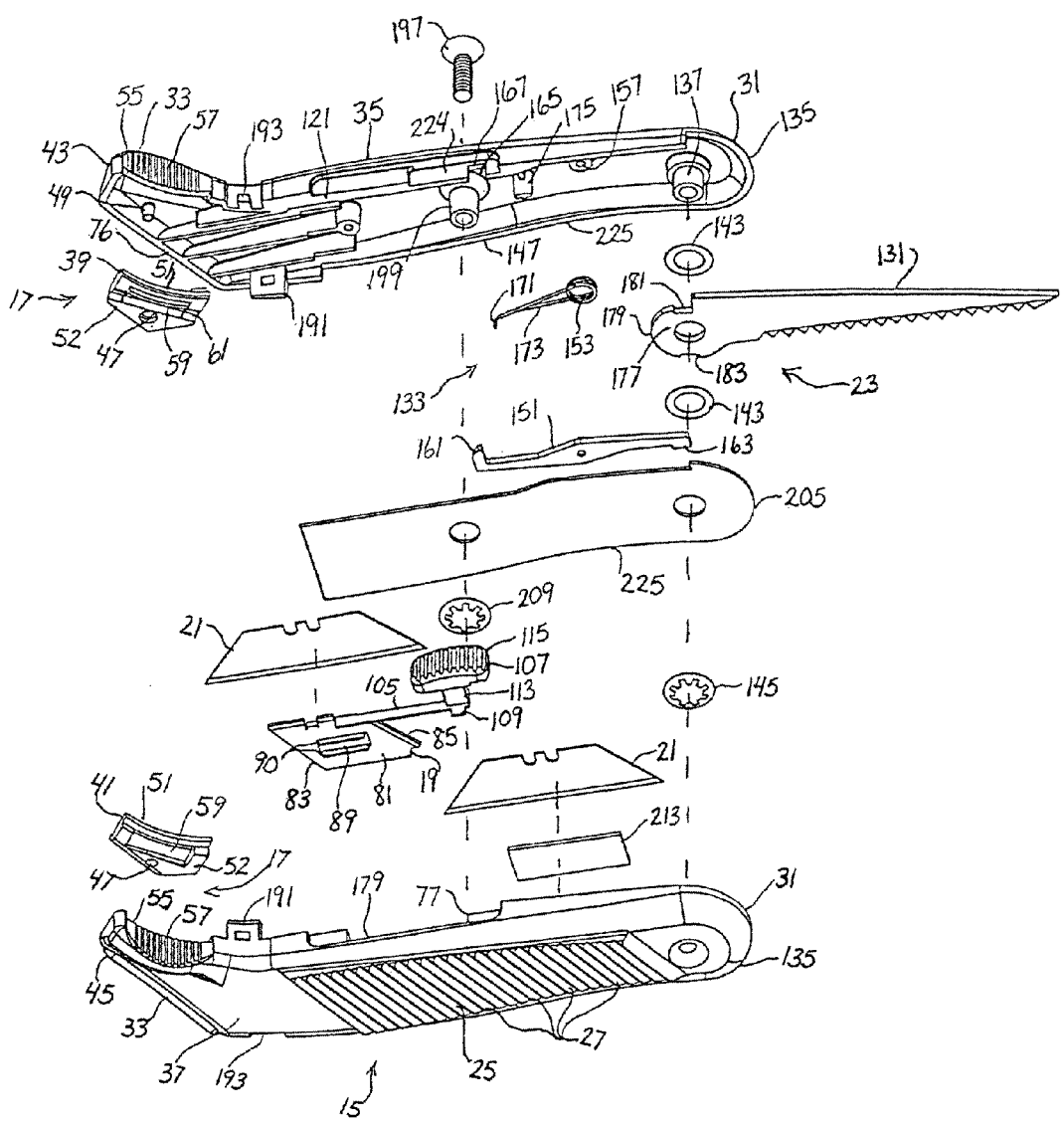
FIG. 3 is an exploded perspective view of the tool of FIG. 1.
Figure 4:
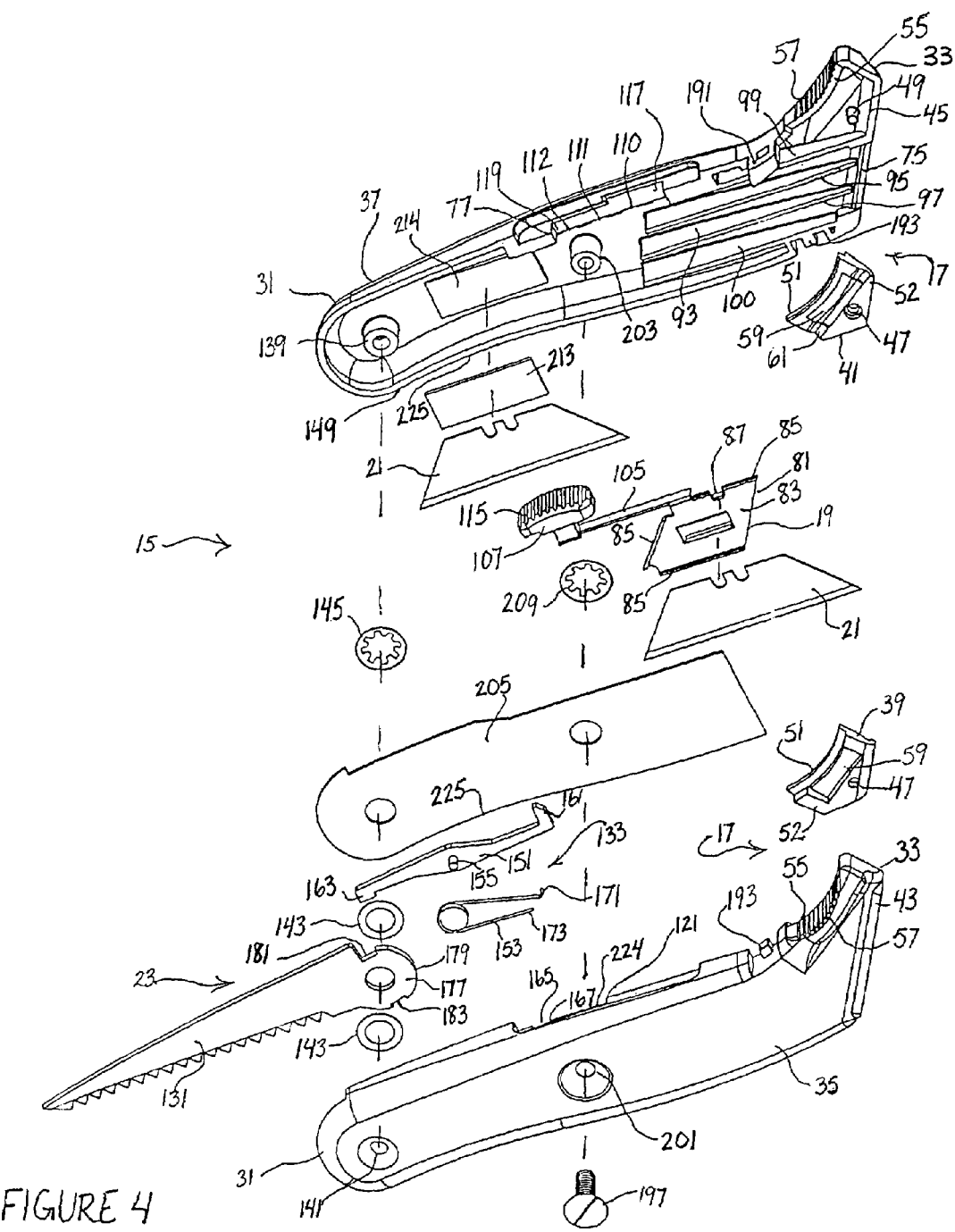
FIG. 4 is an exploded perspective view of the tool from a perspective opposite that of FIG. 3.

Tape measure blade holder assembly 17, used for receiving and holding the blade of a common coiled tape measure while cutting or scoring straight lines (parallel to an edge of the material being cut), includes resilient clips 39 and 41 mounted in housing portions 35 and 37, respectively, at one part 43 and 45, respectively, of the housing portions defining head portion 33 of mount 29 when the housing portions are assembled (see FIGS. 3 and 4). Clips 39 and 41 may be made of conventional material such as plastics or metals, and are secured in mount 29 in any convention way including adhesives, sonic welding or the like. In this particular embodiment, clips 39 and 41 each include a mounting hole 47 for receipt of integral housing mounting pegs 49 therethrough.

Each clip 39/41 includes arcuate lip 51 at mounting body 52, receivable through elongate opening 53 defined by gaps 55 in housing portions 35 and 37 at curvilinear surface portions 57 at parts 43/45 defining head portion 33 (see FIGS. 1 through 4). The clips further include integral yieldable section 59 formed at trough 61, section 59 formed in body 52 at a material portion thereof that is thinner than body 52 and free to move relative thereto on all sides adjacent trough 61. When the clips are installed in housing portions 35 and 37, and when the housing sections are assembled with the clips spaced a preselected distance apart (thus defining assembly 17), the combination defines tape measure blade receiving slot 63 at head portion 33 of housing 29. Spring-type clips 39/41 thus configured and spaced are able to grip tape measure blades of many differing sizes and thicknesses securely (at yieldable sections 59).

The expansive surface at head portion 33 formed by curvilinear surface portions 57 when assembled is provided for applying pressure (particular accommodating thumb pressure, for example, by its shape) to knife blade 21 when cutting. The housing portions 35/37 at parts 43/45 are configured so that the surface formed by portions 57 at head portion 33 of mount 29 is angled relative to handle portion 31 allowing blade 21 to be applied at an angle to the material to be cut during use (as is desirable) while a tape measure held at assembly 17 remains flat relative to the material (as discussed further hereinafter).

Curvilinear surface portions 57 and arcuate lips 51 combined accommodate the normal curvature of most tape measures at the tape measure blade (though straight blades can be received and held). Surface portions 57 both have striations (valleys, ridges or other surface irregularity) formed therein for resisting slip of a thumb or finger(s) applying pressure thereat during cutting procedures. The overall arrangement and configuration of mount 29, providing tape measure holder assembly 17 in close proximity to cutting blade 21 at one end of the mount, and with a tape of the tape measure thus being able to extend from tool 15 normal to the plane of cutting blade 21, is particularly adapted to allow single step measuring and cutting by a worker (while the tape remains in place), typically with only one hand on the tool/tape measure (blade end) itself.

File 25 is formed on housing portion 35 or 37 (37 as shown herein) and is utilized for finishing edges of material (drywall for example) after cutting. Rasp teeth 27 are formed transversely at housing portion 37, the angle selected so that filed material is carried away from the area of exposure of knife blade 21 through mount 29 to prevent clogging or fouling in the area of shuttle 19 and blade 21 and to reduce tool clean-up.

Turning to FIGS. 3 through 7, knife blade shuttle 19 is slidable in mount 29 along a path 71 defined by housing portions 35/37 between opening 73 in head portion 33 of mount 29 (defined by elongated gap 75 at part 45 of housing portion 37 and wall 76 of housing portion 35), whereat blade 21 is fully extended, and terminus 77 in handle portion 31 (at housing portion 37) whereat blade 21 is fully retracted. Shuttle 19 includes blade holding portion 81 having a support wall 83, perimeter ridges 85 and locating dog 87 configured to receive and hold a common EXACTO type razor knife blade (two sided preferably). Guide 89 (a spaced, two raised rail 90, guide) is formed at the back of wall 83 (opposite ridges 85). Guide 89 is configured to ride in guideway 93 in handle portion 31 of mount 29 (at housing portion 37, see FIG. 4) formed by integral fins 95 and 97. Upper and lower guideway fins 99 and 100 are space so that opposing perimeter ridges 85 are guided therebetween, the combination of guideways containing linear movement of shuttle 19 along linear path 71.

Shuttle 19 has resilient arm 105 between blade holding portion 81 and manually manipulable thumb slide 107. Dog 109 is located at the end of arm 105 between the arm and slide 107. Dog 109 is configured to fit into detents 110, 111 and 112 defining preset blade 21 location securements (blade fully extended, partially extended and stored, respectively), dog 109 releasable from a detent 110/111/112 by pressing down on slide 107 thus flexing arm 105 and releasing the dog from the detent. Stem 113 of slide 107 is intermediate arm 105 and actuator 115 of slide 107 and is dimensioned to fit snugly but slidably in elongated access slot 117 through mount 29 formed by gap 119 at housing portion 37 and wall 121 of housing portion 35. Recess 123 is formed in the bottom of actuator 115.

Linear path 71 and tape measure blade receiving slot 63 as defined by the arrangement disclosed hereinabove are located in a substantially coplanar relationship thereby allowing relatively accurate measurement and cutting by accommodating tape measure movement with the tool as a cut is made. The angled relationship of surfaces 57 with slot 63 opening thereto and linear path 71 provides for proper blade 21 cutting angle while accommodating tape measure usage during the cut (i.e., a relatively flat tape in relation to the material being cut). The shuttle can be made of any durable material such as plastics, metal or the like, care being taken in the choice so that resilient arm 105 retains resiliency while being durable over the life of the tool.

Hole saw 23 is an assembly including saw blade 131 and cam group 133. Blade 131 is made of any appropriate material to the particular anticipated tasks (metal generally, though some plastics could be utilized for softer material), and is mounted at end 135 of handle portion 31 of mount 29 pivotably about post 137 of housing portion 35 (post 137, together with post 139 at housing portion 37, also defining tool hanging hole 141 provided for tool storage). Blade 131 is secured in mount 29 by nylon washers 143 and push-on fastener 145 over post 137, and is pivotable out of mount 29 for use thereof through an elongated space in the bottom of mount 29 formed by gap 147 in housing portion 35 (extending along the bottom side of housing portion 35 from a position above post 137 and around end 135—see FIG. 3) and corresponding wall 149 of housing portion 37 (FIG. 4).

Cam group 133 includes cam body 151 and biasing torsion spring 153. Cam body 151 (made of plastic, metal or the like) includes mounting pin 155 receivable in a central opening in pin receptacle post 157 formed in housing portion 35 for rotational movement of cam body 151. Cam legs 161 and 163 extend angularly from cam body 151 at each end, leg 161 extending through mount 29 at opening 165 defined by gap 167 at housing portion 35 and the side wall of terminus 77 of housing portion 37. Torsion spring 153 is mounted over post 157, one leg 171 bearing against cam body 151 at a location spaced from pin 155 and the other leg 173 bearing against buttress 175 at housing portion 35. In this configuration, spring 153 biases the cam legs 161 and 163 in opposite directions.

Figure 6:
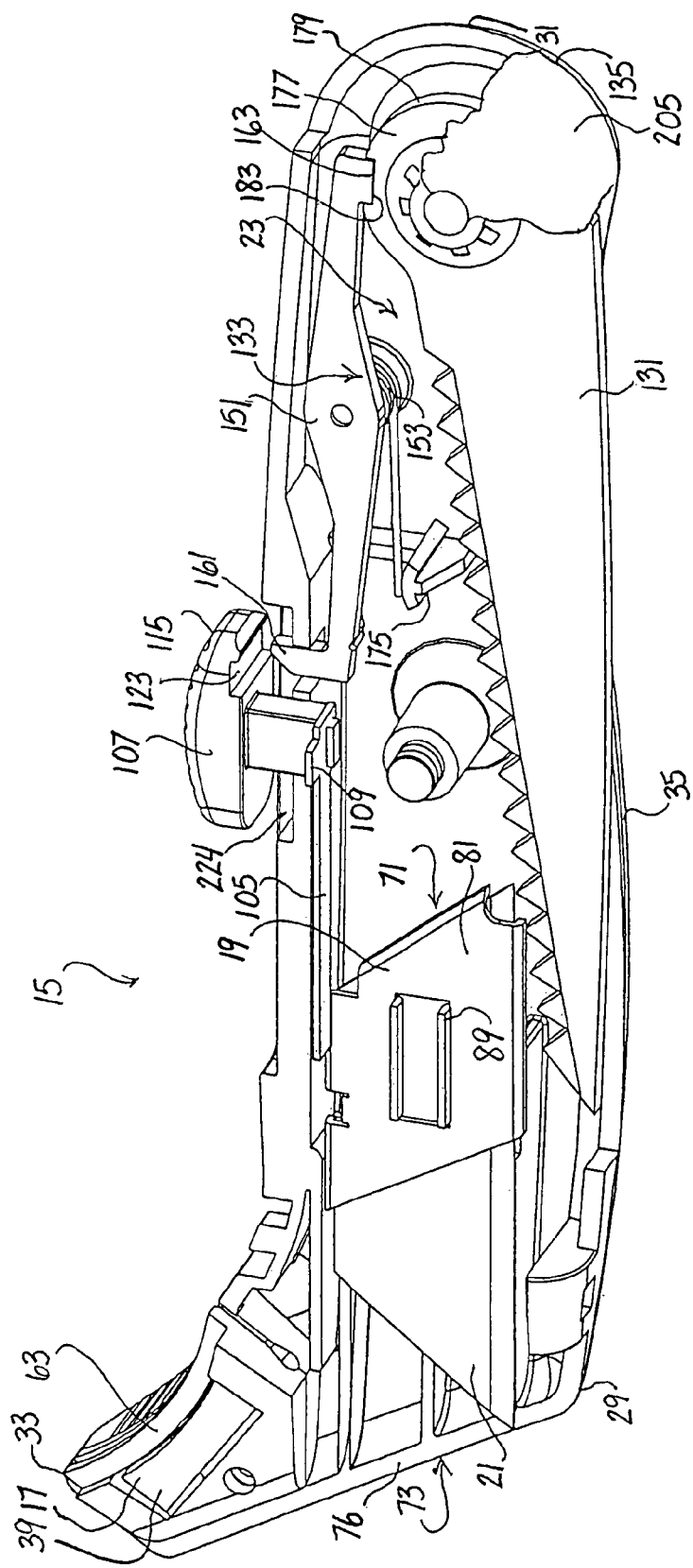
FIG. 6 is a perspective view of the tool of this invention as presented in FIG. 5 showing the tool in a fully stored configuration.

Cam leg 163 is biased toward saw blade base 177 having curved circumferential edge 179 between detents 181 and 183. Detent 183 is positioned for engagement by cam leg 163 when blade 131 is pivoted to the stored orientation as shown in FIG. 6 to secure blade 131 thereat. Detent 181 is positioned for engagement by cam leg 163 when blade 131 is pivoted to the fully extended orientation for securement of blade 131 thereat during sawing operations.

Mount 29 is assembled and secured by retainer clips 191 and matable receiving clips 193, one each at housing portions 35 and 37, and by screw 197 receivable through post 199 (having beveled opening 201 therethrough) at housing portion 35. A mating nut is held in peg 203 at housing portion 37 (see FIGS. 3 and 4). Housing divider and cover plate 205 is held in mount 29 between hole saw 23 and shuttle 19 by push-on fasteners 145 and 209 over mounting posts 137 and 199, respectively. Divider 205 prevents interference between the saw and shuttle and allows storage of a replacement knife blade 21 on magnetic strip 213 secured to inner wall 214 of housing portion 37 on the opposite side of divider 205 from saw blade 131.

Figure 5:
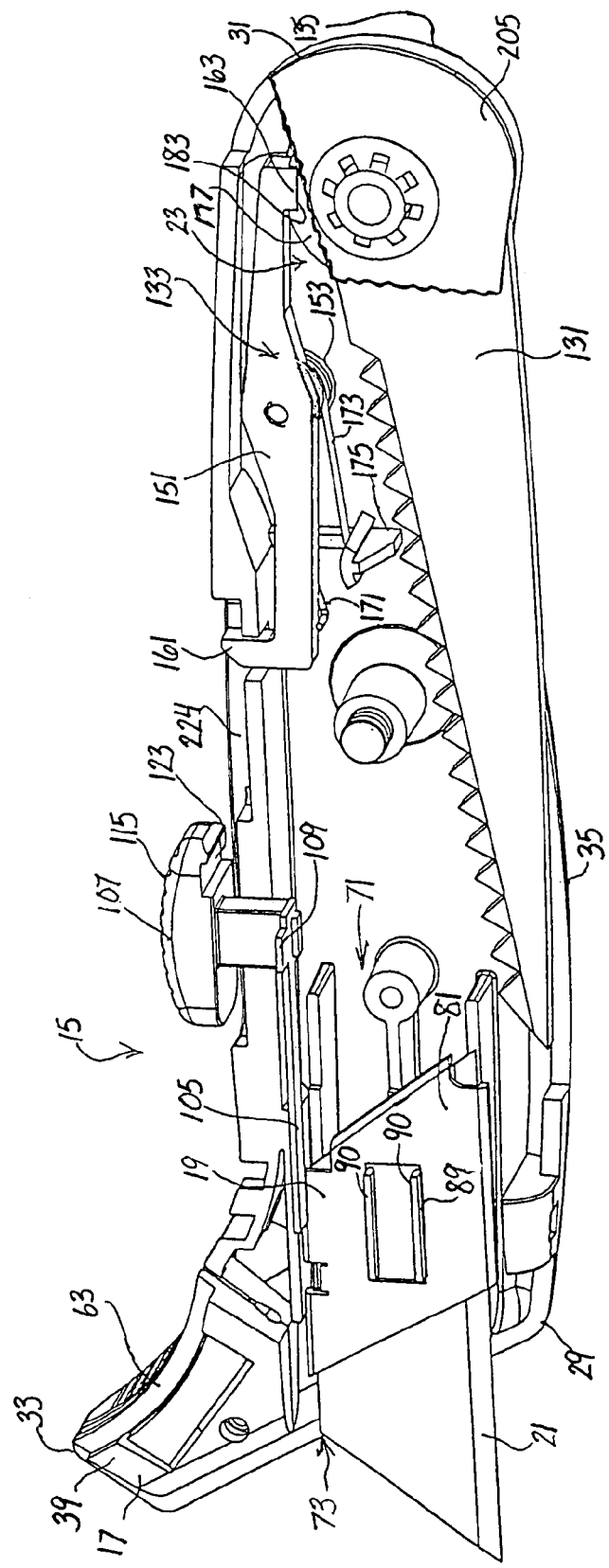
FIG. 5 a perspective view of the combination tool of FIG. 1 with a cut away section and with a portion of the housing removed.
Figure 7:
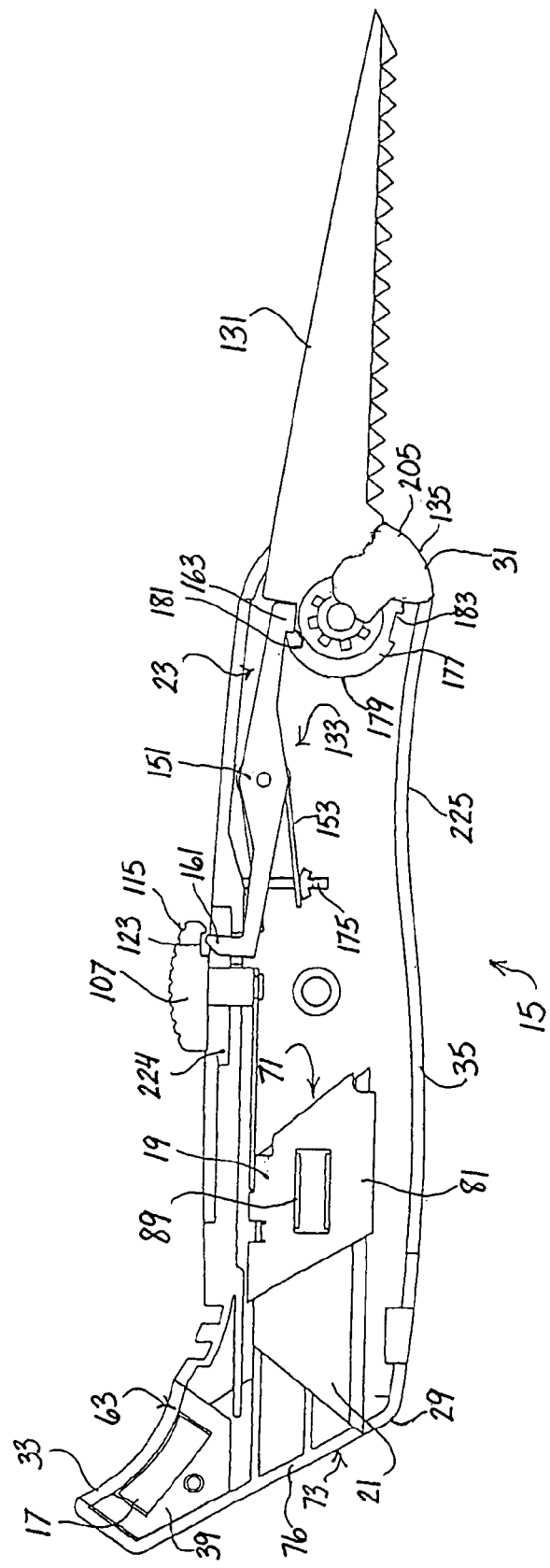
FIG. 7 is a plan view of the tool of this invention as presented in FIG. 5 showing the tool in a different application configuration.

As shown in FIGS. 5 and 6, slide 107 is free to move blade 21 along path 71 when saw blade 131 is not deployed, selected locations for blade 21 being secured along the path by movement of dog 109 into a selected detent 110/111/112. When hole saw 23 is deployed with blade 131 in the fully extended orientation as shown in FIG. 7, engagement of dog 109 at detent 112 (not shown) locks out forward shuttle 19 movement that would expose blade 21 during use of hole saw 23. The different elevations of cam leg 161 of cam body 151 at the different saw blade orientations are caused by the different relative depths of detents 181 and 183, detent 181 being deeper (i.e., ending closer to the center of saw blade base 177) than detent 183. This allows proper clearances for release of dog 109 from detent 112 without engaging cam leg 161 when saw blade 131 is not deployed so that shuttle 19 may be moved, while ensuring interference of cam leg 161 with recess 123 of actuator 115 if release of dog 109 from detent 112 is attempted while saw blade 131 is deployed.

Figure 8:
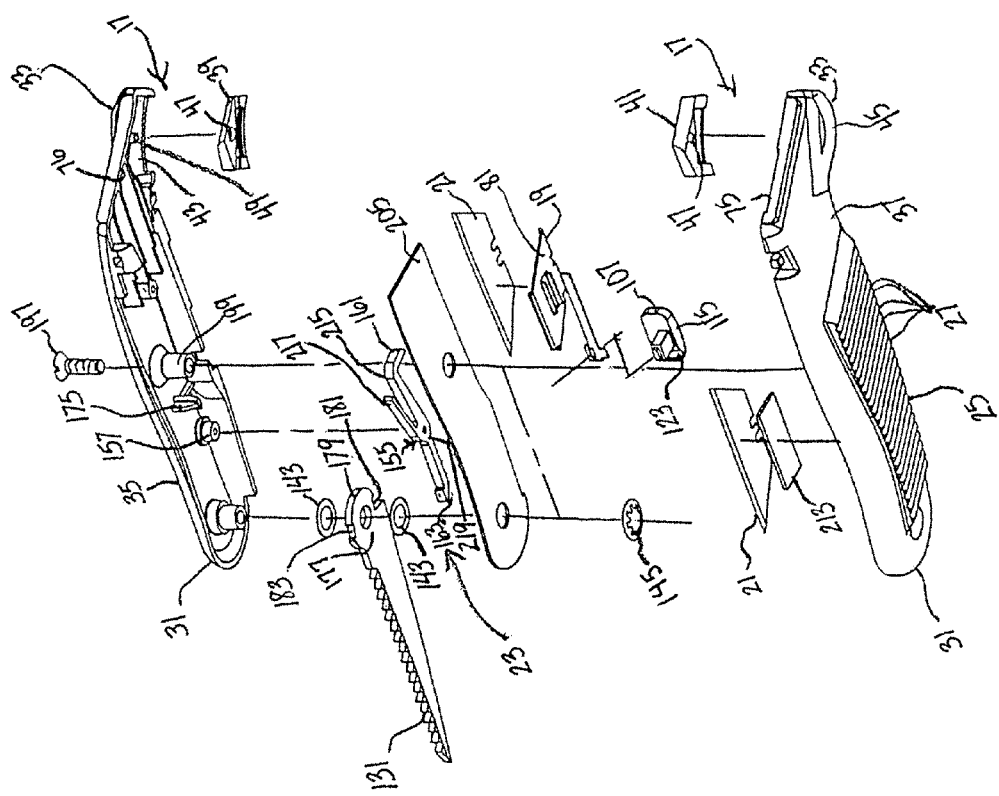
FIG. 8 is an exploded perspective view of showing a second embodiment of the tool of this invention.

A second embodiment of the combination tool of this invention is shown in FIG. 8. The embodiment is similar to embodiment 15 shown heretofore (identical elements being thus identified, though identification of drawing details omitted should be assumed to be the same as shown in the prior embodiment), except that cam group 133 is replaced by unitary cam 215. Cam 215 is structured in many ways the same as cam body 151, including provision of cam mounting pin 155 (pivotably receivable in the opening in post 157) and cam legs 161 and 163. However, cam 215 combines the function of cam body 151 and spring 153 in a single unit by providing unitary resilient biasing leg 217 extending from central cam body portion 219 and bearing against buttress 175 formed in housing portion 35 to bias legs 161 and 163 of cam 215 as described hereinabove.

Figure 9A:
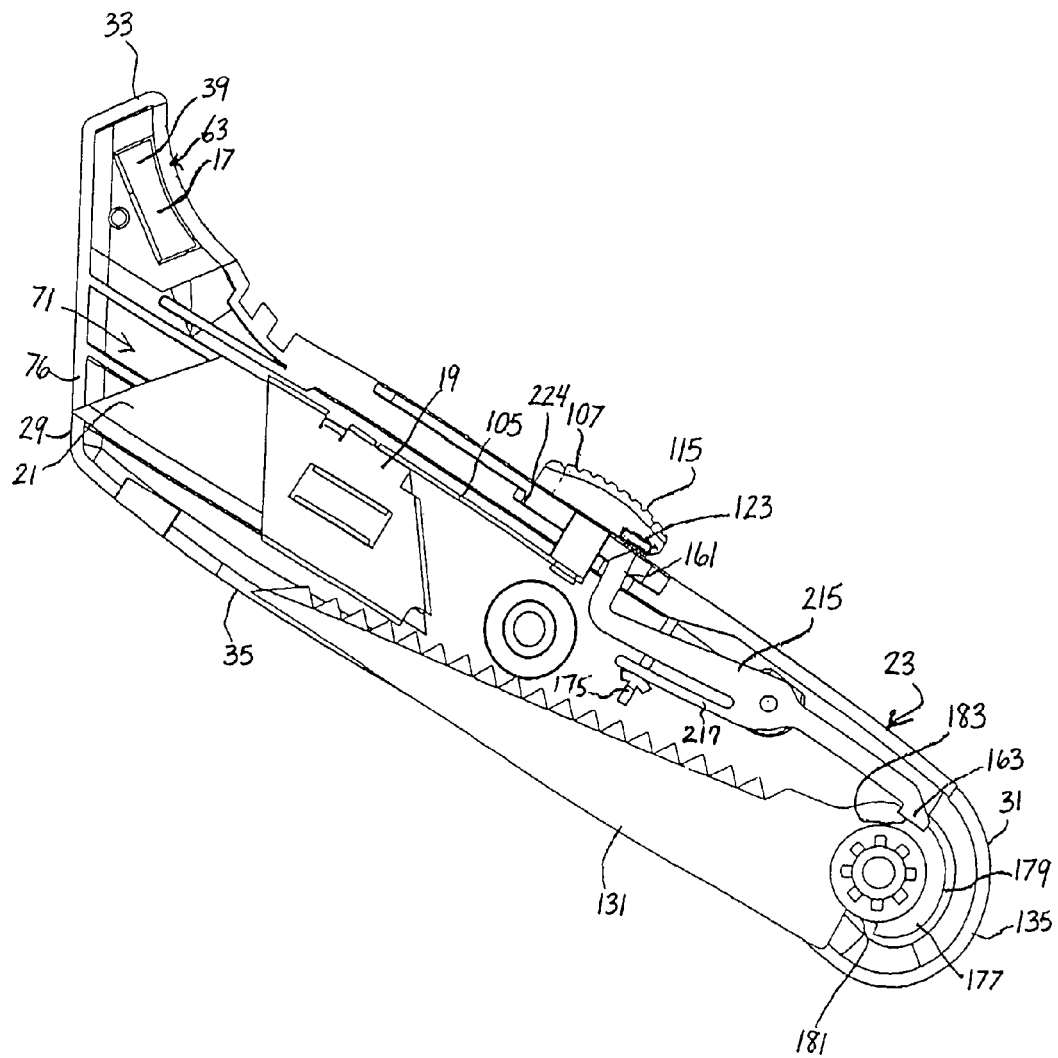
FIGS. 9A through 9D illustrate deployment of the saw blade included in the combination tool of this invention (shown with the embodiment of FIG. 8, though the same general steps and principles apply for deployment of the saw blade in the embodiment of FIG. 1)
Figure 9B:
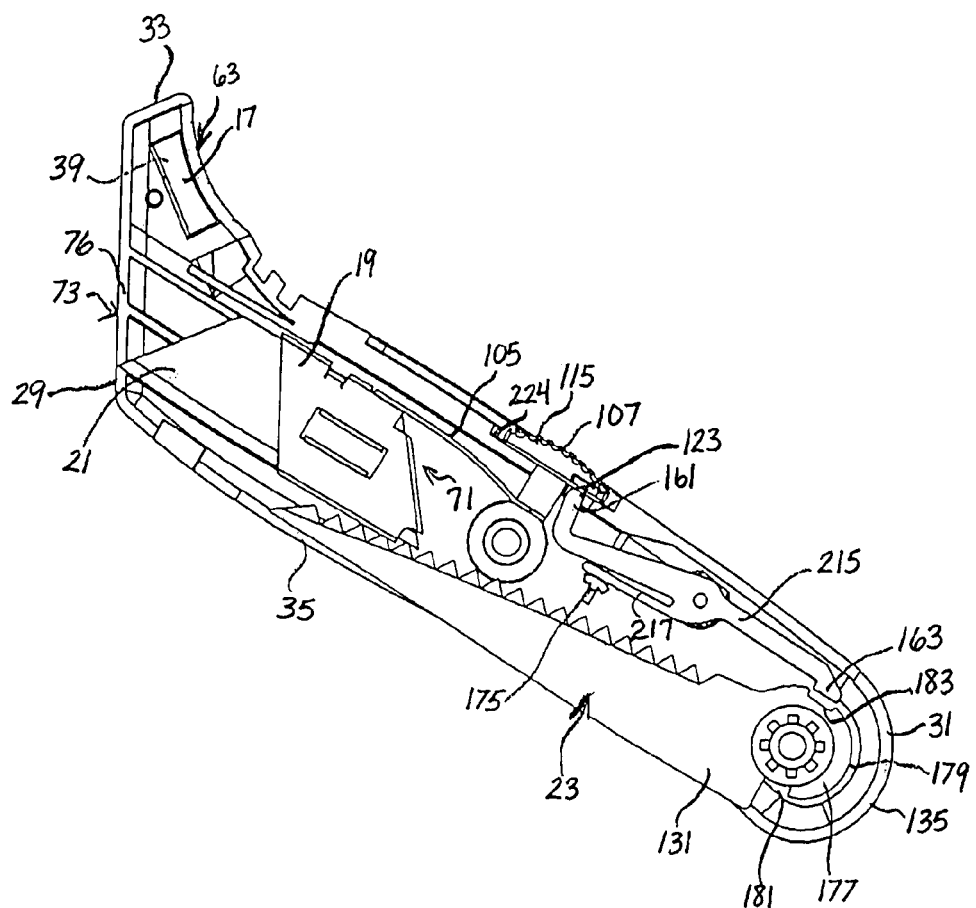
Figure 9C:
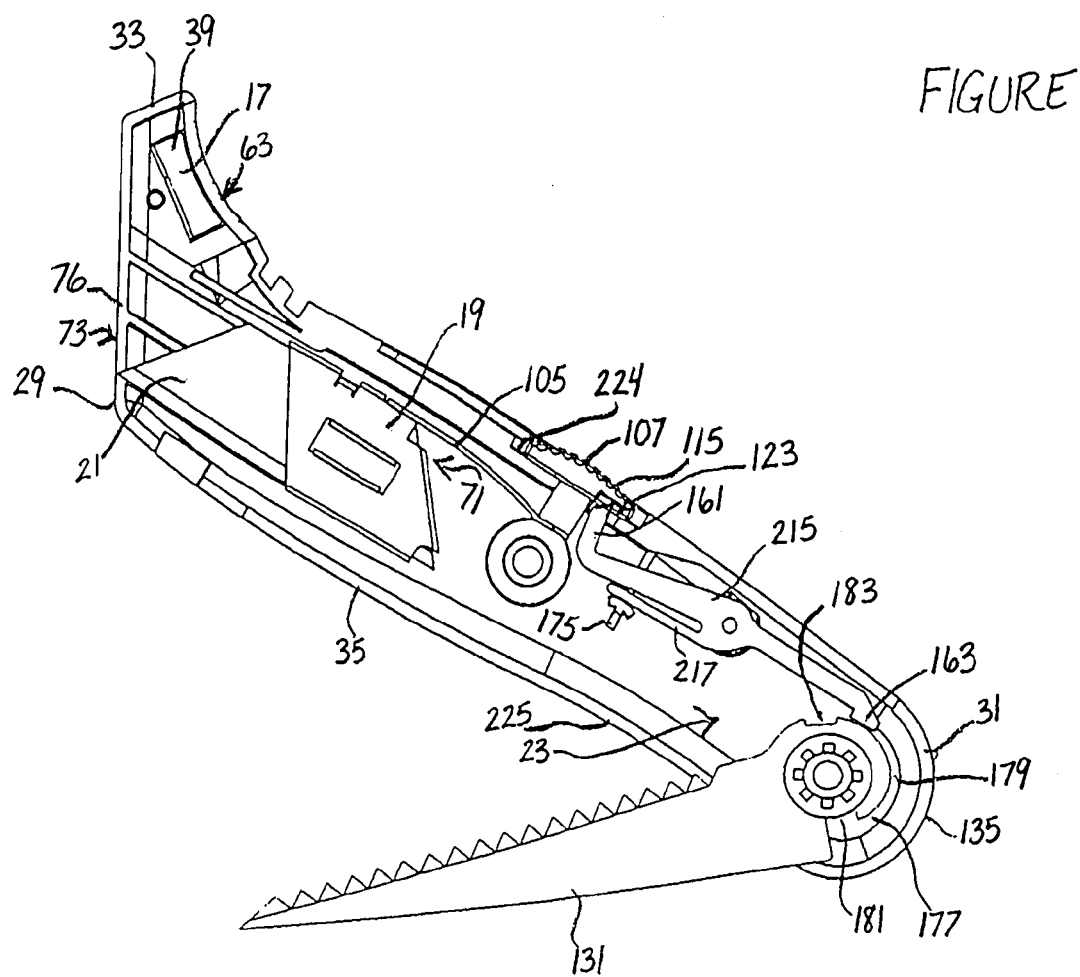
Figure 9D:
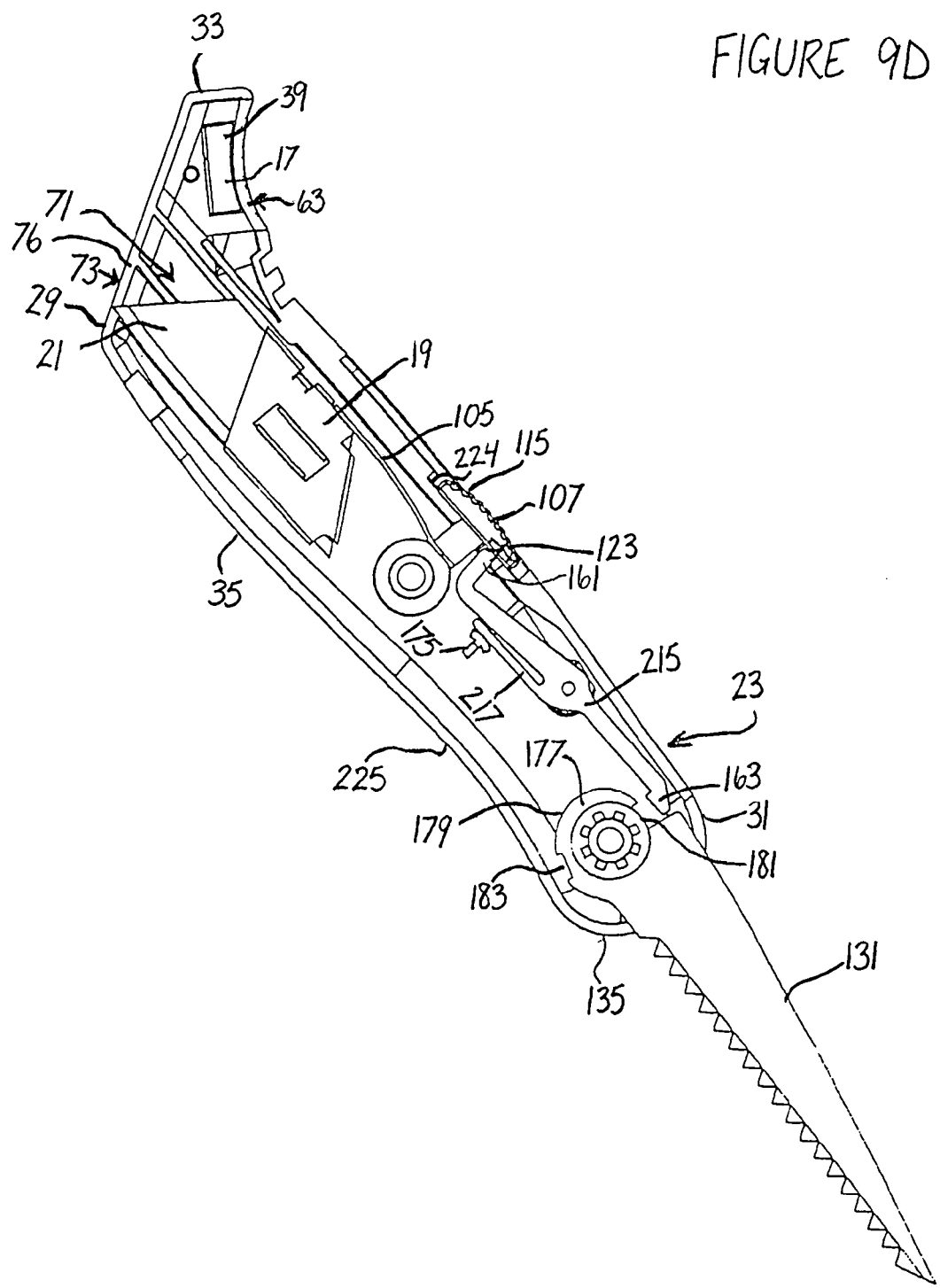
Figure 10:
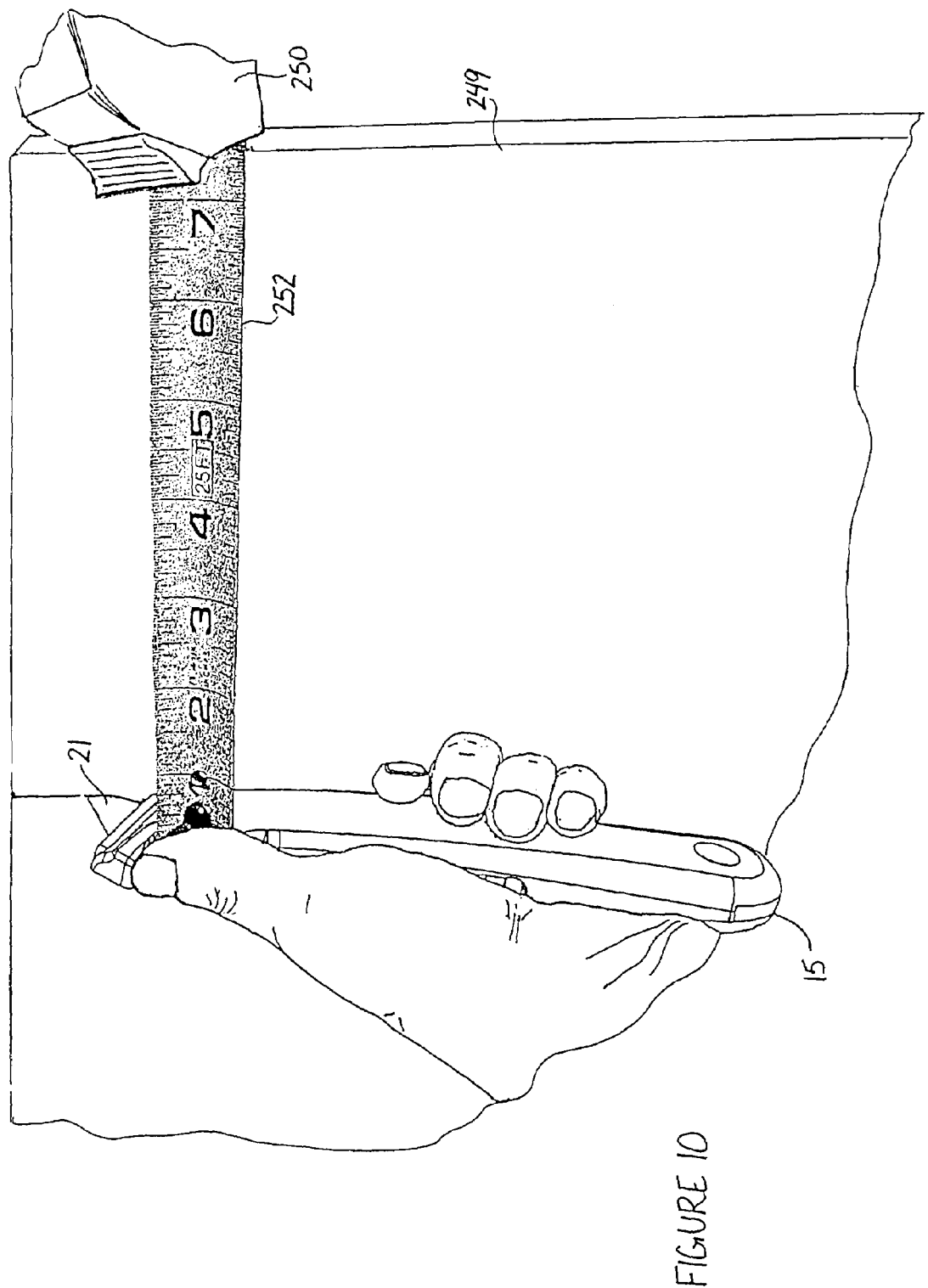
FIG. 10 is a perspective view of the tool of this invention (either embodiment) in use.

Operation of hole saw 23 and use of the tool is illustrated in FIGS. 9A through 10 (FIGS. 9A through 9D depicting the tool shown in FIG. 8 for purposes of illustration only, it being understood that operation of tool 15 shown in FIGS. 1 through 7 is the same as described herein). For ease of illustration only, divider 135 has been removed in FIGS. 9A through 9D. To activate saw blade 131 of hole saw 23, shuttle 19 is fully retracted by manual operation of actuator 115 of slide 107. At this position (FIG. 9A), actuator recess 123 is directly above cam leg 161 and mount recess 224 (defined by housing portions 35 and 37 and just large enough to receive actuator 115 therein when depressed), cam leg 163 being engaged in detent 183 at base 177 of saw blade 131. Downward pressure on actuator 115 flexes arm 105 of shuttle 19 bringing the bottom wall of actuator 115 at recess 123 into contact with cam leg 161 thereby rotating cam 215 against its bias and releasing cam leg 163 from detent 183 at base 177 of saw blade 131 (FIG. 9B). Shuttle 19 cannot move forward to expose knife blade 21 while cam 161 is thus engaged at recess 123 and actuator 115 is in recess 224.

The user rotates saw blade 131 (FIG. 9C) to its fully extended orientation from its stored orientation by gripping the blade where revealed in the stored orientation at mount depression 225 defined by the contour of divider 205 and housing portions 35 and 37 at gap 147 and wall 149, respectively (see FIGS. 3 and 4). Cam leg 163 rides smoothly about circumferential edge 179 of base 177 of saw blade 131 until blade 131 is fully deployed and abuts cam leg 163 ending the ability of a user to continue rotating blade 131. Thereat, cam leg 163 is aligned at detent 181 at base 177 of saw blade 131 (FIG. 9D). Upon release of actuator 115, arm 105 resiliently returns to its beginning position and the cam is rotated under bias so that cam leg 163 engages detent 181 holding blade 131 firmly at the fully extended orientation and ready for use (see FIG. 7).

As disclosed hereinabove in conjunction with FIG. 7, shuttle 19 remains immovable while saw blade 131 is deployed. When operations utilizing saw blade 131 are complete, blade 131 may be released for rotation to its stored orientation by again depressing actuator 115 thereby initiating reversal of the process.

Use of tool 15 of this invention is illustrated in FIG. 10 for cutting a panel of material 249 (such a drywall, for example). As may be appreciated, one step measuring and cutting of the material is accommodated due to the ability to operate the tool with one hand while monitoring the tape measure length indicia position at the edge of the material with the other hand (holding the tape measure housing 250). During use, proper leverage, pressure and cutting angle at blade 21 may be attained while yet maintaining a flat orientation (relative to the material being cut) of the measuring tape 252.

As may be appreciated from the foregoing, an improved combination tool is disclosed for measuring and cutting construction materials (such as drywall or the like). The tool combines the functions of a utility knife, tape measure anchor, hole saw and rasp file in a single tool mount, and is easily employed and safe to use in the field.

What is claimed is:

1. A hand tool for measuring and cutting comprising;
   a mount including a handle portion and a head portion, a linear path formed therein between a terminus in said handle portion and an opening from said head portion, a tape measure blade receiving slot defined in said head portion and oriented so that said slot and said linear path are substantially coplanar;
   a saw blade pivotably connected at said handle portion of said mount;
   a cam operatively held in said handle portion of said mount and cooperative with said saw blade at one part and having an accessible part extending through said mount, operation of said cam required for release of said saw blade from securement at either a stored orientation or a fully extended orientation; and
   a knife blade shuttle selectively movable along said linear path formed in said mount between said terminus and said opening, said knife blade shuttle including a manipulable portion accessible through said handle portion of said mount for slidably moving said shuttle along said linear path and for selectively engaging said accessible part of said cam for operating said cam.

2. The hand tool of claim 1 wherein said head portion of said mount includes a surface adjacent to said slot, said surface having striations formed therein for resisting slip.

3. The hand tool of claim 1 further comprising a divider in said mount between said knife blade shuttle and said saw blade.

4. The hand tool of claim 3 further comprising a magnetic strip located at said handle portion of said mount at a side of said divider opposite said saw blade for holding a replacement blade usable in said knife blade shuttle.

5. The hand tool of claim 1 wherein said saw blade is connected in said handle portion of said mount at an end thereof opposite said head portion of said mount, wherein said one part of said cam is a first leg and wherein said accessible part of said cam is an opposite leg, operation of said cam allowing pivoting movement of said saw blade to the other of said stored orientation or said fully extended orientation and resecurement thereat.

6. The hand tool of claim 5 wherein said knife blade shuttle includes a blade holding portion having said manipulable portion extending away therefrom, said manipulable portion accessible at a position spaced from said head portion and including a recess therein engageble with said opposite leg of said cam when said knife blade shuttle is moved to said terminus in said handle portion for operating said cam to allow movement of said saw blade.

7. The hand tool of claim 5 wherein said saw blade includes a mounting base for pivotable connection at said handle portion of said mount, said mounting base having first and second detents positioned thereabout at locations corresponding to said stored orientation and said fully extended orientation of said saw blade, respectively, and engageable by said first leg of said cam, said cam including means for biasing said first leg of said cam toward engagement with said detents at said mounting base of said saw blade.

8. A combination tool for cutting drywall comprising:
   first and second housing portions forming a mount when assembled, said mount having a path defined therein by said first and second housing portions with said path terminating at an opening between said first and second housing portions at one end of said mount, a tape measure blade receiving slot being defined in said mount by said first and second housing portions and located in said one end of said mount adjacent to said path, an access at said mount being defined by said first and second housing portions at a position spaced from said one end of said mount, and an exterior surface of said mount being characterized by a plurality of rasp teeth thereat for filing, one of said first and second housing portions including a plurality of detents positioned to be adjacent to said path defined in said mount;
   first and second resilient clips at said first and second housing portions, respectively, adjacent to said slot defined in said mount and configured to cooperatively grip a tape measure blade received in said slot;
   a knife blade shuttle selectively movable along said path defined in said mount and including a blade holding portion and a manually manipulable portion extending away from said blade holding portion, said manually manipulable portion having a slide including a recess therein and a resilient arm between said blade holding portion and said slide, said slide accessible through said access at said mount, a dog located between said slide and said arm releasably engageable in said detents of said one of said first and second housing portions;
   a saw blade pivotably connected in an opposite end of said mount from said one end; and
   a cam having one leg and an opposite leg maintained at one of said first and second housing portions and cooperative with said saw blade at said one leg thereof and accessible at said opposite leg thereof through said mount adjacent to said access at said position spaced from said one end of said mount, said cam including biasing means for biasing said one leg of said cam toward engagement with said saw blade while biasing said opposite leg of cam through said mount, wherein said recess of said slide of said manually manipulable portion of said knife blade shuttle is engageble with said opposite leg of said cam when said knife blade shuttle is moved to a retracted position for selectively operating said cam against bias of said biasing means by depressing said slide to allow movement of said saw blade.

9. The combination tool of claim 8 wherein at least one of said first and second housing portions includes at least a first guideway, and wherein said knife blade shuttle includes a guide, said guideway and said guide cooperatively containing movement of said knife blade shuttle.

10. The combination tool of claim 8 further comprising a divider in said mount between said knife blade shuttle and said saw blade.

11. The combination tool of claim 8 wherein said rasp teeth are formed transversely at one of said housing portions and oriented directionally to carry material away from said opening at said one end of said mount.

12. The combination tool of claim 8 wherein said saw blade is mounted at one of said first and second housing portions at the interior of said mount, said saw blade pivotable from a stored orientation within said mount to a fully extended orientation through an elongated space defined in said mount between said first and second housing portions.

13. The combination tool of claim 8 wherein said mount has a head portion at said one end of said mount and a handle portion.

14. The combination tool of claim 13 wherein said head portion is enlarged in at least one dimension relative to said handle portion and is characterized by a surface area progressively angularly diverging from said handle portion, said tape measure blade receiving slot being located through said surface area of said head portion of said mount.

* * * * *